United States Patent
Ushio et al.

(10) Patent No.: US 11,611,687 B2
(45) Date of Patent: Mar. 21, 2023

(54) BLADE OPEN-CLOSE DEVICE AND ELECTRONIC DEVICE

(71) Applicant: Nidec Copal Corporation, Tokyo (JP)

(72) Inventors: Ryosuke Ushio, Tokyo (JP); Kenzo Imai, Tokyo (JP); Koji Sawanobori, Tokyo (JP); Nobuaki Watanabe, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 17/402,614

(22) Filed: Aug. 16, 2021

(65) Prior Publication Data
US 2022/0060608 A1   Feb. 24, 2022

(30) Foreign Application Priority Data
Aug. 21, 2020   (JP) .............................. JP2020-140339

(51) Int. Cl.
*H04N 5/225*   (2006.01)
*G06F 21/82*   (2013.01)

(52) U.S. Cl.
CPC ......... *H04N 5/2252* (2013.01); *H04N 5/2254* (2013.01); *H04N 5/2257* (2013.01)

(58) Field of Classification Search
CPC .. H04N 5/2251; H04N 5/2252; H04N 5/2254; H04N 5/2257
USPC ........................................ 348/373, 375, 376
See application file for complete search history.

(56) References Cited

U.S. PATENT DOCUMENTS

| | | | |
|---|---|---|---|
| 8,174,609 B2 | 5/2012 | Sekimoto et al. | |
| 2010/0309369 A1* | 12/2010 | Jarvis | H04N 5/2257 348/371 |
| 2014/0176788 A1* | 6/2014 | Chen | H04N 5/2257 348/362 |
| 2016/0165116 A1* | 6/2016 | Robinson | H04N 5/2252 348/362 |
| 2020/0196142 A1* | 6/2020 | Yang | G06F 1/1686 |
| 2020/0218132 A1* | 7/2020 | Weng | G03B 11/041 |

FOREIGN PATENT DOCUMENTS

| | | |
|---|---|---|
| JP | 2004309954 A | 11/2004 |
| JP | 2009288327 A | 12/2009 |
| WO | WO-2018021633 A1 * 2/2018 ............... G02B 7/02 |

* cited by examiner

*Primary Examiner* — Anthony J Daniels
(74) *Attorney, Agent, or Firm* — Hauptman Ham, LLP (57) ABSTRACT

A thin blade open-close device is incorporated in a limited space. A blade open-close device includes a base located on a module board including a lens unit, a partition located opposite to the module board from the base, and a cover plate located opposite to the base from the partition. The partition and the cover plate each have an opening aligned with an optical axis of the lens unit. The blade open-close device includes a blade movable in X-direction in a blade chamber defined between the cover plate and the partition, an actuator that moves the blade between a closing position to cover the openings and an opening position to uncover the openings, and a terminal plate extending in Z-direction. The terminal plate electrically connected to the actuator includes connectors at its end adjacent to the module board to be electrically connected to contacts on the module board.

6 Claims, 8 Drawing Sheets

BLADE OPEN-CLOSE DEVICE AND ELECTRONIC DEVICE

RELATED APPLICATIONS

The present application claims priority to Japanese Application Number 2020-140339, filed Aug. 21, 2020, the disclosure of which is hereby incorporated by reference herein in its entirety.

BACKGROUND

Technical Field

The present invention relates to a blade open-close device and an electronic device, and particularly, to a blade open-close device for covering and uncovering an opening with a blade.

Description of the Background

Recent electronic devices, such as smartphones, smart speakers, and drones, incorporate a camera. Such a camera typically has a lens aperture constantly uncovered, or being constantly ready for image capturing. In this state, the camera may be operated by a malicious third party, possibly capturing images or videos unintended by the user. Such images or videos can be used for crime.

In particular, an electronic device incorporating a camera is now often connected to a network such as the Internet. The connected electronic device may be operated remotely by a malicious program without being noticed by the user. When the electronic device is operated remotely, image capturing may be performed without being noticed by the user, possibly allowing the camera to capture images or videos for transmission to external devices. For privacy protection of the user, structures are awaited for preventing image capturing with a camera as unintended by the user.

Such structures for preventing image capturing with a camera may include a known camera shutter that opens and closes a blade between a lens and a subject (refer to, for example, Patent Literature 1). However, the camera shutter may not fit in an electronic device that is smaller and has a limited space for a camera module. In particular, recent electronic devices tend to incorporate a camera module to be smaller in the optical axis direction of a lens, or in other words, to be thinner.

CITATION LIST

Patent Literature

Patent Literature 1: Japanese Unexamined Patent Application Publication No. 2009-288327

BRIEF SUMMARY

In response to the above issue, one or more aspects of the present invention are directed to a thin blade open-close device incorporated in a limited space and an electronic device including the blade open-close device.

A thin blade open-close device according to a first aspect of the present invention can be incorporated in a limited space. The blade open-close device is mountable on a module board including a lens unit. The blade open-close device includes a base located on the module board and a cover plate covering at least part of the base. The cover plate has an opening aligned with an optical axis of the lens unit. The blade open-close device includes a blade movable in an opening and closing direction perpendicular to the optical axis in a blade chamber defined between the cover plate and the base, an actuator that moves the blade between a closing position to cover the opening and an opening position to uncover the opening, and a terminal plate extending parallel to the optical axis. The terminal plate is electrically connected to the actuator. The terminal plate includes connectors at an end of the terminal plate adjacent to the module board to be electrically connected to contacts on the module board.

An electronic device according to a second aspect of the present invention includes a module board, a lens unit mounted on the module board, and the blade open-close device described above.

DETAILED DESCRIPTION

A blade open-close device according to one or more embodiments of the present invention will now be described in detail with reference to FIGS. 1 to 8. In FIGS. 1 to 8, the same or corresponding components are given the same reference numerals, and will not be described repeatedly. In FIGS. 1 to 8, the scale and dimensions of each component may be exaggerated, or one or more components may not be shown. Unless otherwise specified, the terms such as first and second will be used simply to distinguish the components and will not represent a specific order or sequence.

Figure 1:
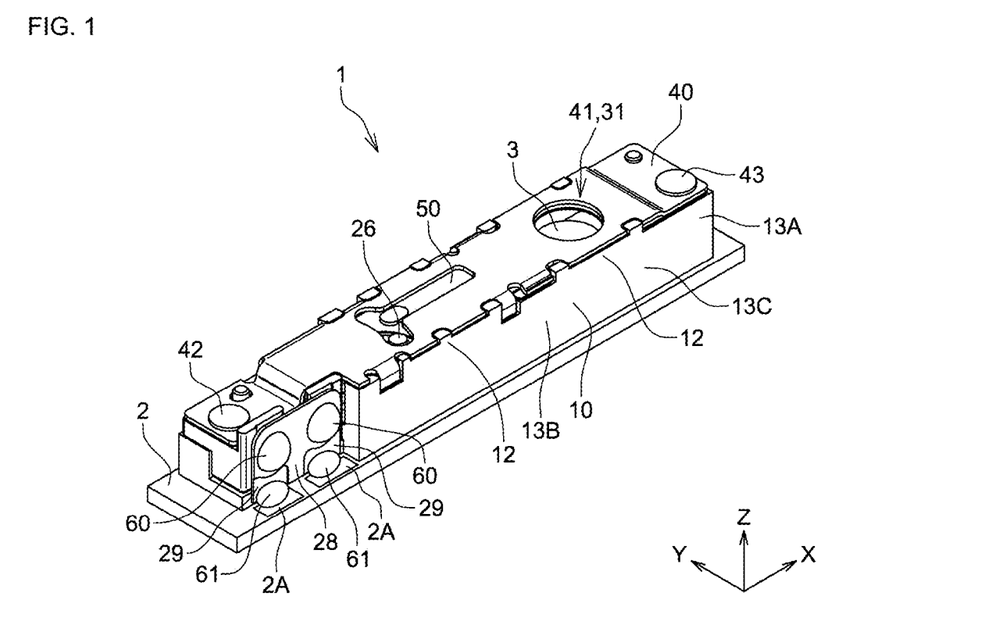
FIG. 1 is a perspective view of a blade open-close device according to one embodiment of the present invention, together with a module board and a lens unit.
Figure 2:
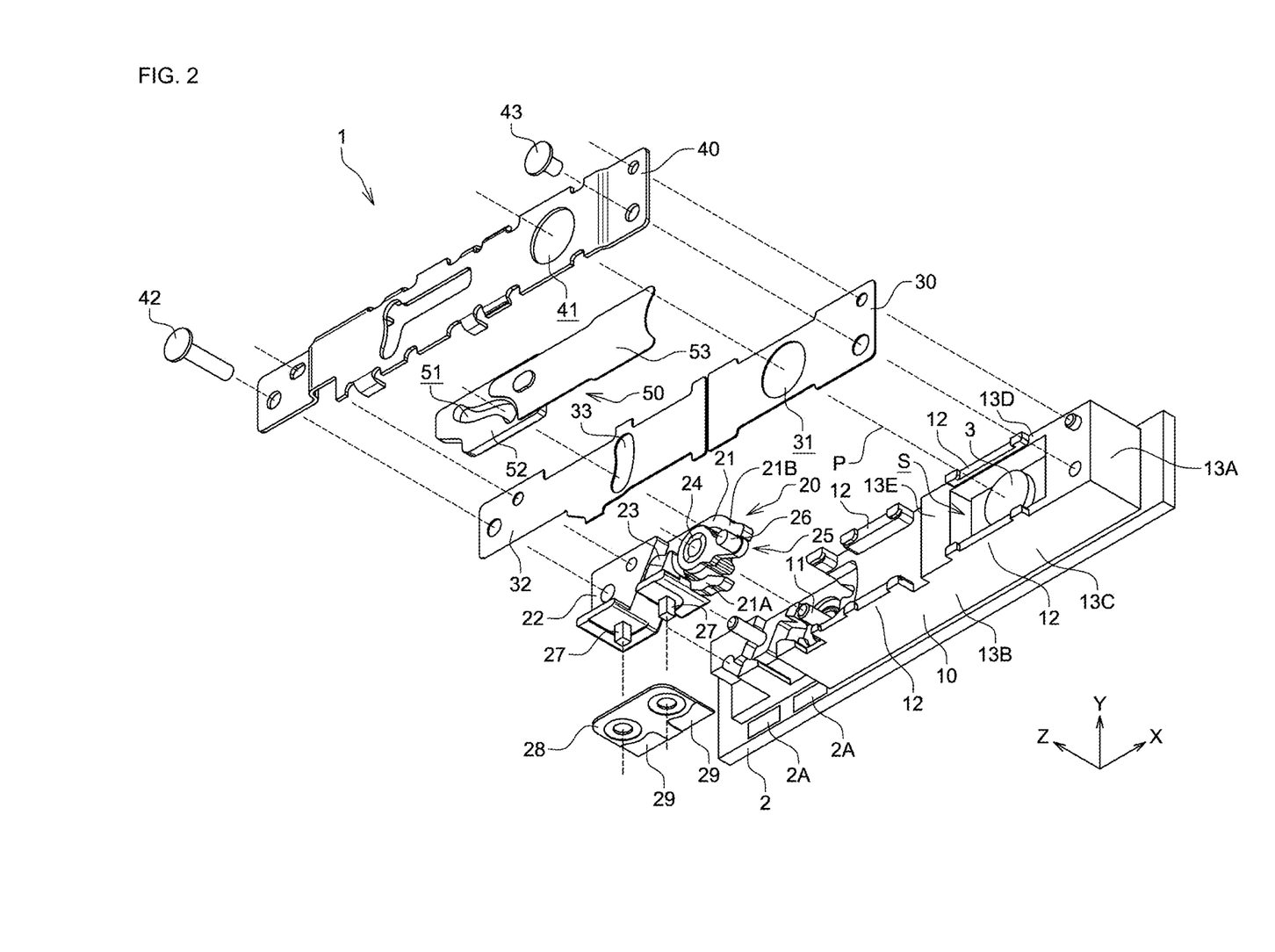
FIG. 2 is an exploded perspective view of the blade open-close device in FIG. 1.
Figure 3:
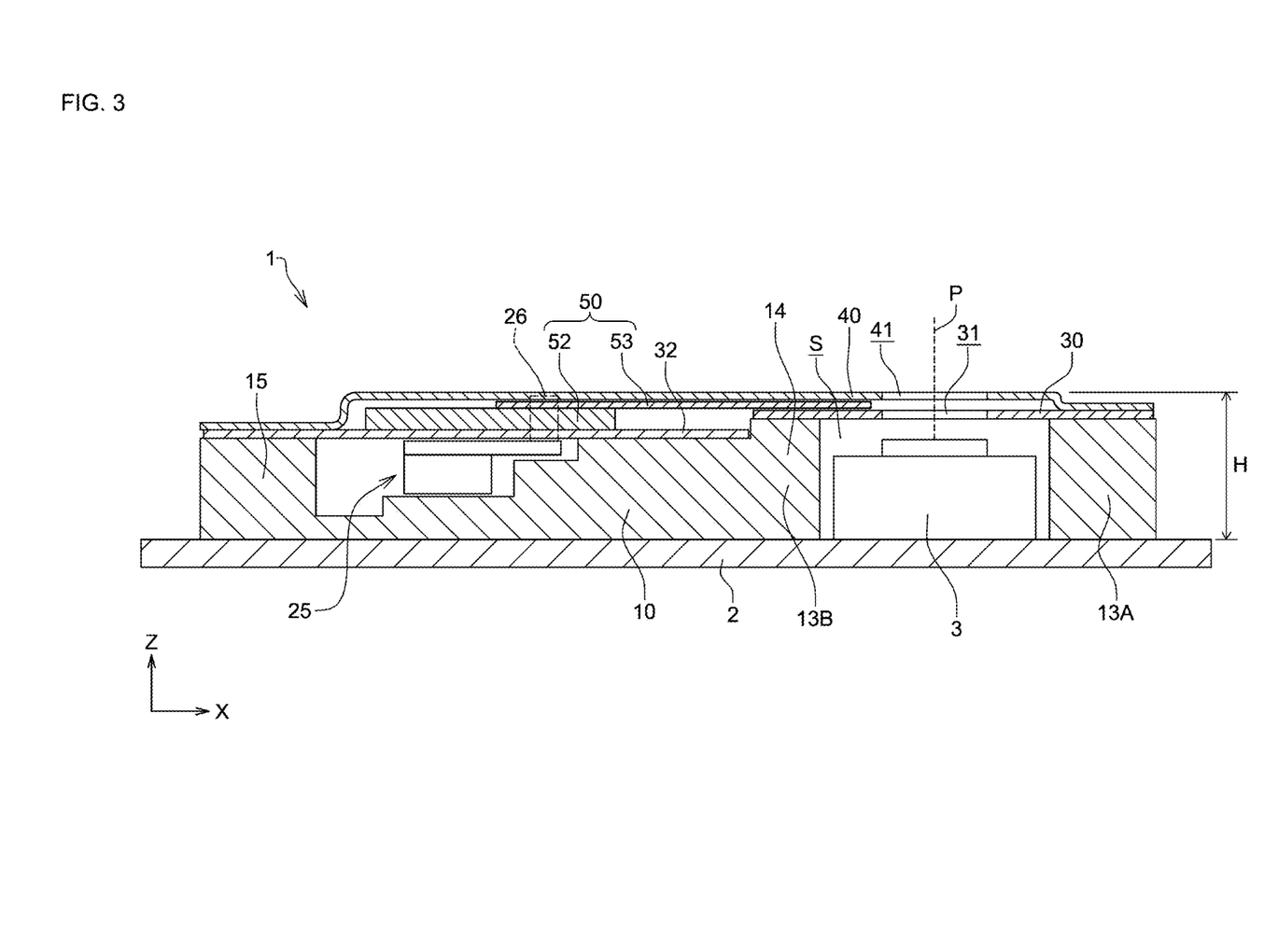
FIG. 3 is a schematic longitudinal cross-sectional view of the blade open-close device in FIG. 1.
Figure 4:
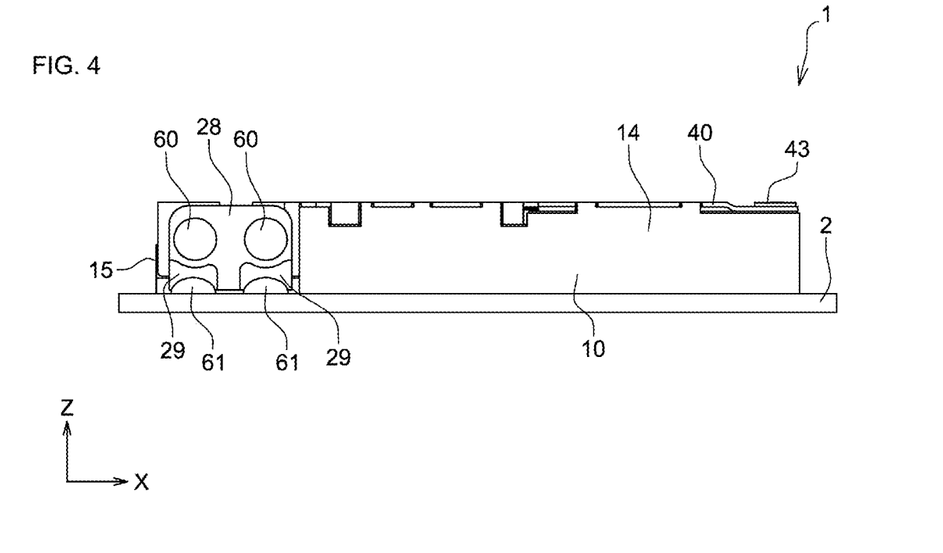
FIG. 4 is a schematic front view of the blade open-close device in FIG. 1.
Figure 5:
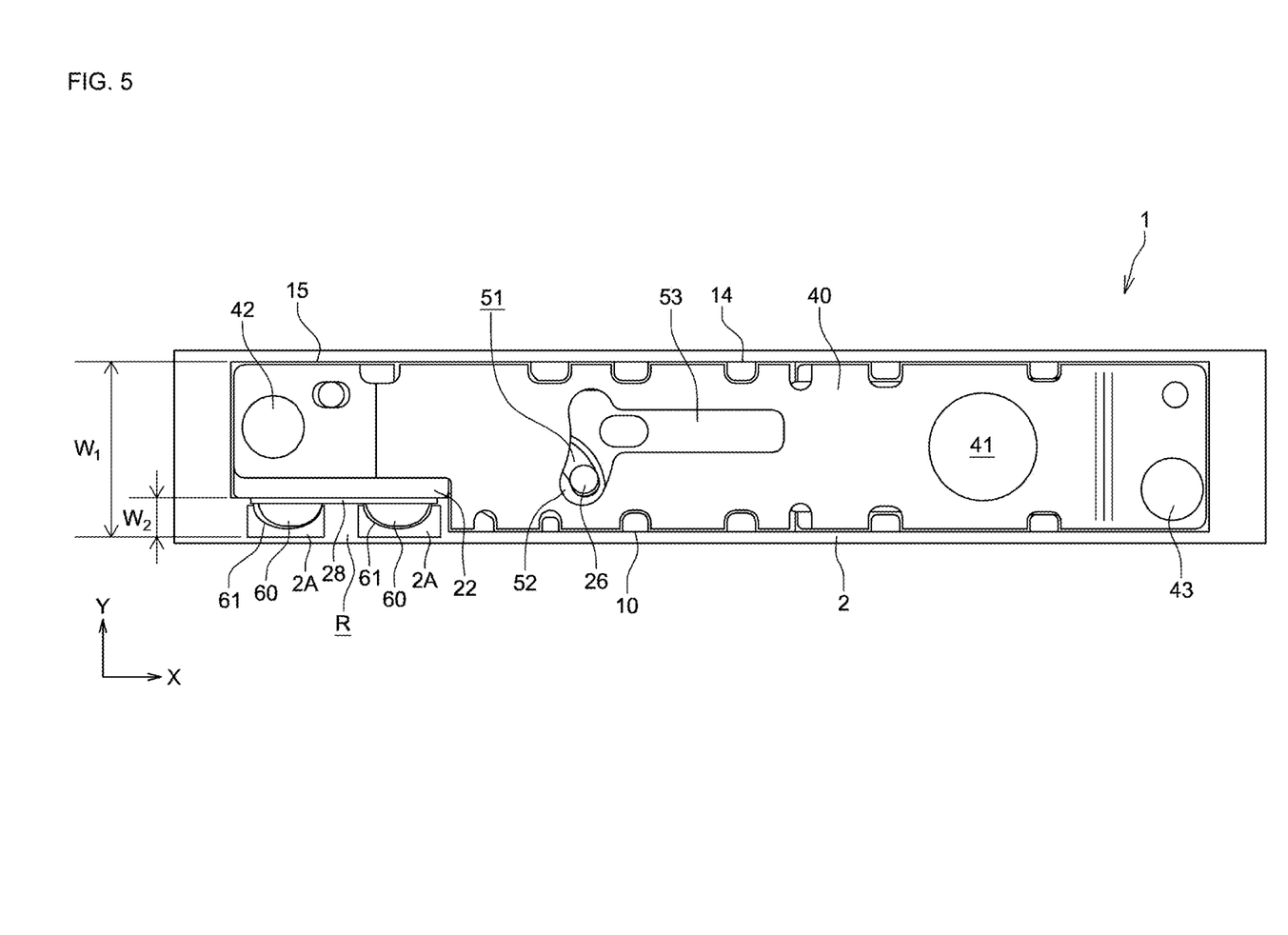
FIG. 5 is a schematic plan view of the blade open-close device in FIG. 1.

FIG. 1 is a perspective view of a blade open-close device 1 according to one embodiment of the present invention. FIG. 2 is an exploded perspective view of the device. FIG. 3 is a schematic longitudinal cross-sectional view of the device. FIG. 4 is a schematic front view of the device. FIG. 5 is a schematic plan view of the device. As shown in FIGS. 1 to 5, the blade open-close device 1 according to the present embodiment is mounted on, for example, a camera module incorporated in an electronic device, and more specifically, on a module board 2 on which a lens unit 3 is mounted. For ease of understanding, in FIG. 3, some parts are shown simply or not shown, and the dimensions of other parts are exaggerated. For ease of explanation in the present embodiment, up or upward refers to the positive Z-direction in FIG. 1, and down or downward refers to the negative Z-direction.

As shown in FIGS. 1 to 5, the blade open-close device 1 includes a base 10 attached to the module board 2, an actuator 20 located on the base 10, a partition 30 located opposite to the module board 2 from the base 10, a cover plate 40 covering an upper portion of the base 10, a blade 50 located between the cover plate 40 and the partition 30, and a partition 32 located between the actuator 20 and the blade 50. The blade open-close device 1 is mounted on the surface of the module board 2 on which the lens unit 3 is mounted.

As shown in FIGS. 2 and 3, the base 10 has a substantially rectangular accommodating space S accommodating the lens unit 3 mounted on the module board 2. More specifically, the base 10 includes peripheral walls 13A, 13B, 13C, and 13D that surround the lens unit 3. The peripheral walls 13A, 13B, 13C, and 13D, the partition 30, and the module board 2 define the accommodating space S accommodating the lens unit 3. The partition 30 described above is located on an upper surface 13E of the peripheral walls 13A, 13B, 13C, and 13D.

The partition 30 has an opening 31. The cover plate 40 has an opening 41. The openings 31 and 41 are aligned with an optical axis P of the lens unit 3. In the present embodiment, the partition 32 is separate from the partition 30 having the opening 31. However, the partition 30 having the opening 31 and the partition 32 may be integral as a single partition. In another embodiment, the partition 30, the partition 32, or both may be eliminated. When the partition 30 is eliminated, an aperture (described later) is defined by the opening 41 in the cover plate 40.

The cover plate 40 is fastened to the base 10 with pins 42 and 43 together with, for example, the partitions 30 and 32. Rather than with pins, the cover plate 40 may be fastened to the base 10 with, for example, screws.

The actuator 20 includes a yoke 21 formed from a magnetic material, a coil base 22, a coil 23 wound around the yoke 21 and the coil base 22, a rotor magnet 24 rotatably attached to a shaft 11 extending in the positive Z-direction from the base 10, and a lever 25 connected to the rotor magnet. The yoke 21 in the present embodiment is thin and flat in Z-direction. The yoke 21 is U-shaped and includes two arms 21A and 21B. The coil 23 is wound around the arm 21A. The rotor magnet 24 is located between the arms 21A and 21B of the yoke 21. The rotor magnet 24 includes a magnet having different magnetic poles around the shaft 11. The lever 25 includes a cylindrical engagement part 26 extending in the positive Z-direction radially outside the rotor magnet 24.

The coil base 22 includes terminals 27 protruding in the negative Y-direction. The ends of the coil 23 are wound around the terminals 27. The ends of the coil 23 are fixed to the terminals 27 with, for example, solder joints 60 together with a metal terminal plate 28 as shown in FIG. 1. The terminal plate 28 extends parallel to an XZ plane and includes connectors 29 at its end adjacent to the module board 2 (in the negative Z-direction). The connectors 29 are electrically connected to contacts 2A on the module board 2 with, for example, solder joints 61 as shown in FIGS. 1 and 4. In this manner, the coil 23 in the actuator 20 is electrically connected to wiring (not shown) in the module board 2 with the terminal plate 28.

The blade 50 includes a base plate 52 having a cam groove 51 and a blade plate 53 attached to the base plate 52. The cam groove 51 extends in the negative Y-direction, gradually redirecting in the positive X-direction. The cam groove 51 has a width in X-direction slightly larger than the outer diameter of the engagement part 26 of the lever 25 in the actuator 20. In the present embodiment, the base plate 52 and the blade plate 53 are separate, but may be integrated into the blade 50. In another embodiment, the blade 50 may be movable without the cam groove 51.

The blade 50 is located between guides 12 extending in the positive Z-direction from the edge of the base 10 in Y-direction (refer to FIG. 2). The blade 50 is thus movable in X-direction while being guided by the guides 12 of the base 10. More specifically, the blade 50 is movable in X-direction (opening and closing direction) in a blade chamber defined between the cover plate 40 and the partitions 30 and 32.

The partition 30 has the opening 31 (aperture) that determines the amount of light entering the lens unit 3. Thus, the partition 30 may be referred to as an aperture blade. When the partition 30 is eliminated, the opening 41 in the cover plate 40 functions as the aperture.

The partition 32 has an arc-shaped groove 33 along an arc with the shaft 11 on the base 10 at the center. The arc-shaped groove 33 has a width in the radial direction slightly larger than the outer diameter of the engagement part 26 of the lever 25 in the actuator 20. The engagement part 26 of the lever 25 is placed in the cam groove 51 in the blade 50 through the arc-shaped groove 33 in the partition 32. The engagement part 26 of the lever 25 can thus move in the arc-shaped groove 33 in the partition 32 along the arc with the shaft 11 of the base 10 at the center, and can also move in the cam groove 51 while engaging with the cam groove 51 in the blade 50. The engagement part 26 of the lever 25 in the actuator 20 engages with the cam groove 51 in the blade 50 to move the blade 50 in X-direction as the engagement part 26 moves.

Figure 6A:
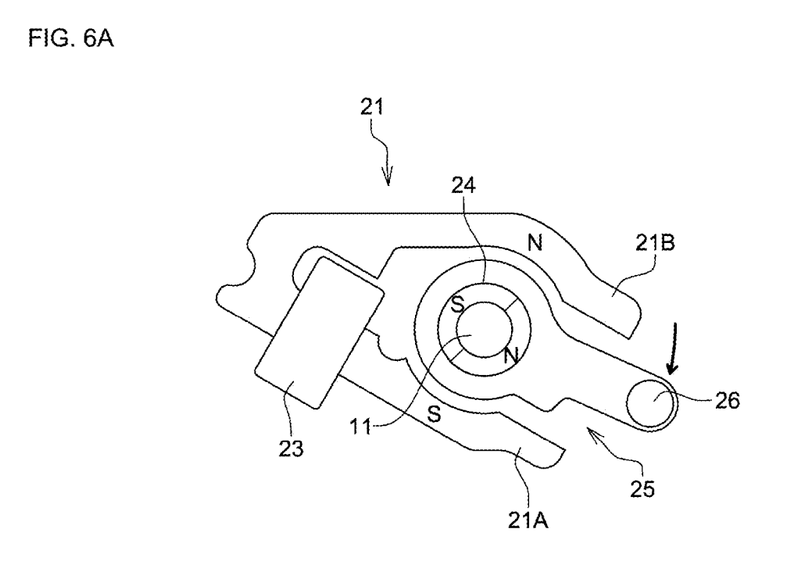
FIG. 6A is a schematic plan view of an actuator shown in FIG. 2, showing its example operation.
Figure 6B:
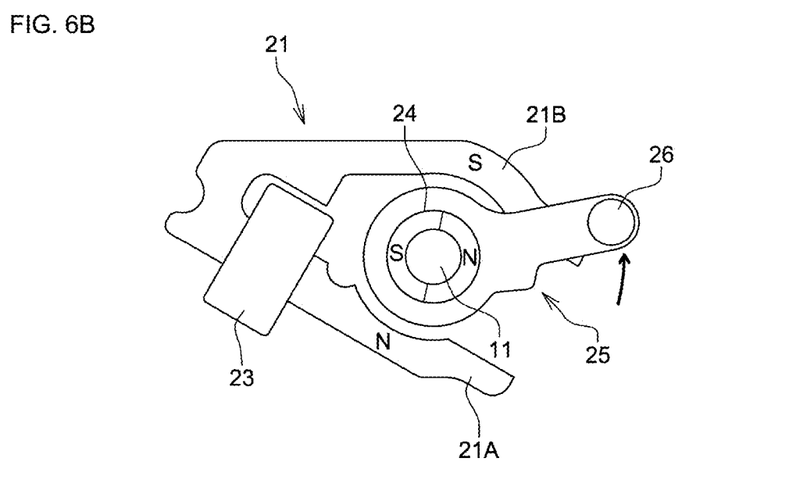
FIG. 6B is a schematic plan view of the actuator shown in FIG. 2, showing its example operation.

FIGS. 6A and 6B are schematic plan views of the actuator 20, each showing its example operation. In the actuator 20 in the present embodiment, a current flows through the coil 23 in the actuator 20 through the wiring of the module board 2, causing the arms 21A and 21B of the yoke 21 to be magnetically polarized (magnetized) oppositely to each other. The magnetic forces of the arms 21A and 21B then attract and rotate the rotor magnet 24.

Figure 7A:
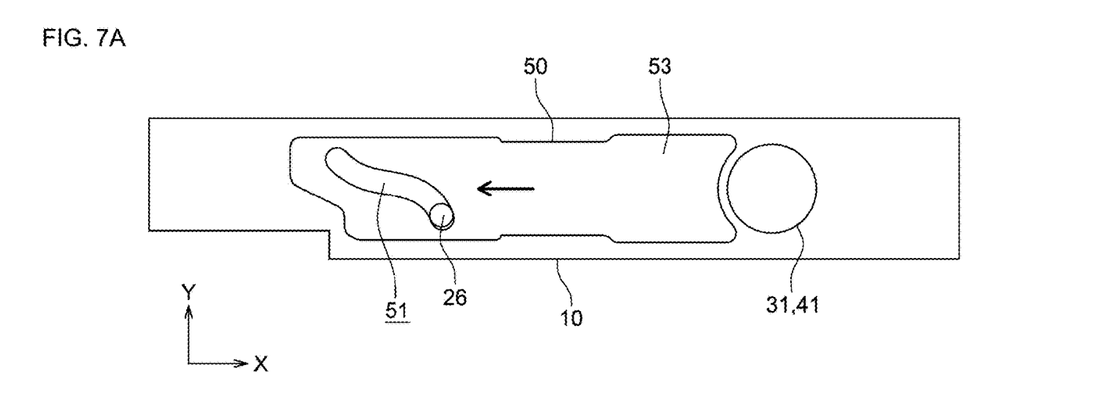
FIG. 7A is a schematic plan view of a blade at a position moved by the actuator shown in FIG. 6A.

For example, when a current flows through the coil 23 in the actuator 20 in one direction to cause the arms 21A and 21B of the yoke 21 to be magnetically polarized or magnetized as shown in FIG. 6A, the magnetic poles of the arms 21A and 21B of the yoke 21 attract the respective opposite magnetic poles of the rotor magnet 24, thus rotating the rotor magnet 24 clockwise about the shaft 11. At this time, the engagement part 26 of the lever 25, engaged with the cam groove 51 in the blade 50, moves the blade 50 in the negative X-direction to the position shown in FIG. 7A. The blade 50 at this position does not cover the opening 31 in the partition 32 and the opening 41 in the cover plate 40, thus leaving the openings 31 and 41 uncovered. This allows external light to directly enter the lens in the lens unit 3 through the opening 31 in the partition 32 and the opening 41 in the cover plate 40, thus enabling image capturing with the lens unit 3. The position of the rotor magnet 24 shown in FIG. 6A and the position of the blade 50 shown in FIG. 7A are hereafter referred to as an opening position.

Figure 7B:
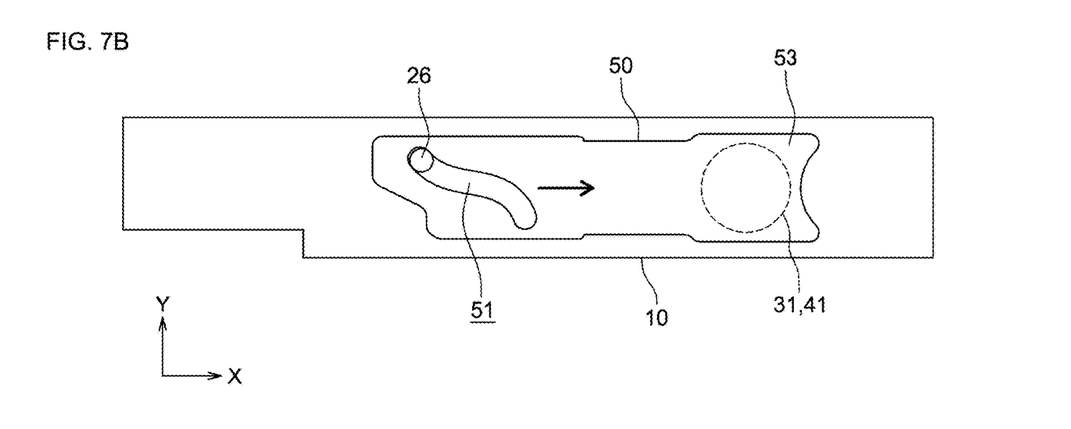
FIG. 7B is a schematic plan view of the blade at a position moved by the actuator shown in FIG. 6B.

When a current in a direction opposite to the direction of the current in FIG. 6A flows through the coil 23 in the actuator 20 to cause the arms 21A and 21B of the yoke 21 to be magnetically polarized as shown in FIG. 6B, the magnetic poles of the arms 21A and 21B of the yoke 21 attract the respective opposite magnetic poles of the rotor magnet 24, thus rotating the rotor magnet 24 counterclockwise about the shaft 11. At this time, the engagement part 26 of the lever 25, engaged with the cam groove 51 in the blade 50, moves the blade 50 in the positive X-direction to the position shown in FIG. 7B. The blade 50 (blade plate 53) at this position covers the opening 31 in the partition 32 and the opening 41 in the cover plate 40. More specifically, the blade 50 aligns with the optical axis P of the lens unit 3, blocking light passing through the opening 41 in the cover plate 40. The position of the rotor magnet 24 shown in FIG. 6B and the position of the blade 50 shown in FIG. 7B are hereafter referred to as a closing position.

In this manner, the actuator 20 rotates the rotor magnet 24 between the closing position and the opening position with power from the module board 2, thus enabling the blade 50 to move between the closing position and the opening position with the engagement part 26 of the lever 25.

The blade plate 53 formed from, for example, a material opaque to light to be captured by the lens unit 3 (e.g., visible light and infrared light) blocks light passing through the opening 41 in the cover plate 40 when the blade 50 is at the closing position, preventing the light from reaching the lens unit 3. In this state, the lens unit 3 in operation is not allowed to capture images or videos. This prevents images or videos unintended by the user from being obtained.

The blade plate 53 of the blade 50 may not fully block light entering the lens unit 3 through the openings 41 and 31, and may partially block light entering the lens unit 3. To partially block light entering the lens unit 3, for example, the blade plate 53 may be formed from a material having a low transmittance to light to be captured by the lens unit 3 (e.g., visible light and infrared light), may be colored, or may be patterned with irregularities or holes (e.g., a reticulated or grid pattern and a concentric circle pattern). This causes images or videos captured by the lens unit 3 to be partly unclear or invisible, thus preventing images or videos unintended by the user from being obtained.

The blade plate 53 may have a predetermined optical effect (e.g., a mosaic filter, scattering, and diffuse reflection) to light entering the lens unit 3 through the openings 41 and 31. Such a blade plate 53 also causes images or videos captured by the lens unit 3 to be partly unclear or invisible, thus preventing images or videos unintended by the user from being obtained.

In the present embodiment, the yoke 21 is shaped to attract the rotor magnet 24 under the magnetic force from the rotor magnet 24 without any current flowing through the coil 23 in the actuator 20. More specifically, when a current flowing through the coil 23 in the actuator 20 is stopped in the state shown in FIG. 6A, the rotor magnet 24 can remain at the opening position with its magnetic force acting on the yoke 21. Similarly, when a current flowing through the coil 23 in the actuator 20 is stopped in the state shown in FIG. 6B, the rotor magnet 24 can remain at the closing position with its magnetic force acting on the yoke 21.

In this manner, the yoke 21 can be shaped to prevent the blade 50 from unintendedly moving from the opening position or the closing position or from stopping between the opening position and the closing position without any current flowing through the coil 23 in the actuator 20. The yoke 21 may be shaped to retain the rotor magnet 24 at either the opening position or the closing position. In particular, retaining the rotor magnet 24 at the closing position causes the blade plate 53 of the blade 50 to cover the openings 41 and 31 without any current flowing through the coil 23 in the actuator 20. This can prevent images or videos unintended by the user from being obtained.

As shown in FIG. 4, the terminal plate 28 is a flat metal plate extending parallel to Z-axis and includes connectors 29 located adjacent to the module board 2. The terminal plate 28 is connected to contacts 2A on the module board 2 at the connectors 29. This allows the actuator 20 to be electrically connected to the wiring in the module board 2 with the terminal plate 28, while minimizing a height H (refer to FIG. 3) of the blade open-close device in Z-direction. Additionally, this structure allows the connectors 29 of the terminal plate 28 to be relatively near an end of the blade open-close device 1 in the negative Z-direction and the blade 50 to be relatively near an end of the blade open-close device 1 in the positive Z-direction. The blade 50 thus receives less heat generated in joining the connectors 29 to the contacts 2A on the module board 2 with the solder joints 61, and also receives less flux used during soldering with the solder joints 61. This reduces defects such as deformation of the blade 50 under heat from the solder 61 or flux attached to the blade 50 to disable opening or closing of the blade 50.

The base 10 in the present embodiment includes a body 14 having the accommodating space S accommodating the lens unit 3 and a terminal end 15 connected to the body 14 in X-direction. As shown in FIG. 5, the terminal end 15 of the base 10 has a width in Y-direction (width direction) that is smaller than a width $W_1$ of the body 14 by a recess width $W_2$, forming a recess R in the negative X-direction of the body 14. The terminal plate 28 described above is located in the recess R. This structure allows the actuator 20 to be electrically connected to the wiring in the module board 2 with the terminal plate 28 while minimizing the width $W_1$ of the blade open-close device 1 in Y-direction. This structure additionally causes the connectors 29 of the terminal plate 28 to be relatively near an end of the blade open-close device 1 in the negative X-direction and the blade 50 to be relatively near an end of the blade open-close device 1 in the positive X-direction. The blade 50 thus receives less heat generated in joining the connectors 29 to the contacts 2A on the module board 2 with the solder joints 61, and also receives less flux used during soldering with the solder joints 61. This further reduces defects such as deformation of the blade 50 under heat from the solder joints 61 or flux attached to the blade 50 to disable opening or closing of the blade 50.

In this structure, extra enlarging of the recess width $W_2$ can disable the actuator 20 from being housed easily in the base 10. The recess width $W_2$ may thus be smaller than or equal to half the width $W_1$ of the body 14 of the base 10.

When the blade 50 is at the closing position, the outer surface of the blade plate 53 of the blade 50 is exposed outside through the opening 41 in the cover plate 40. The outer surface of the blade plate 53 may by colored with a highly visible color (e.g., red) or may be designed with, for example, a highly visible geometrical pattern (e.g., a star, a square, or a polygon), a logo, or an illustration. The blade plate 53 having such an outer surface with a highly visible color or design allows the user to easily view the blade plate 53 being at the closing position and to easily learn that the user is protected from unintended image or video capturing.

Although the opening 41 in the cover plate 40 and the opening 31 in the partition 30 are circular in the illustrated embodiment, the openings 41 and 31 may not be circular, and may be of any shape such as rectangular and elliptical.

Although the actuator 20 includes the flat U-shaped yoke 21 and the rotor magnet 24 in combination in the above embodiment, the actuator 20 to be used is not limited to this structure, and may have any structure that can move the blade 50 between the closing position and the opening position.

Figure 8:
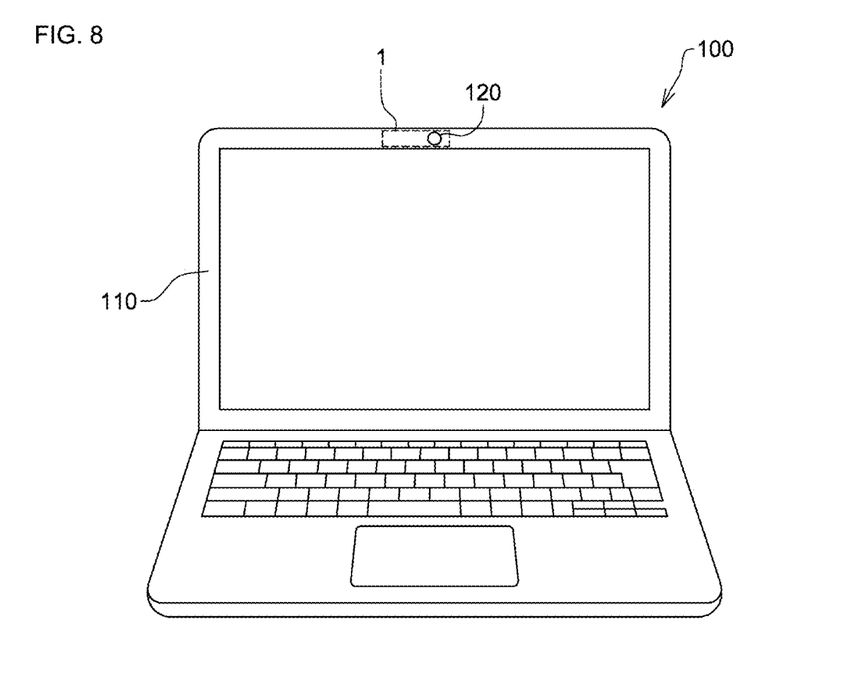
FIG. 8 is a schematic diagram of a laptop personal computer as an electronic device according to one embodiment of the present invention.

FIG. 8 is a schematic diagram of a laptop personal computer 100 as an example electronic device incorporating the above blade open-close device 1. A lid 110 of the laptop personal computer 100 has a window 120 for a camera. The blade open-close device 1 is incorporated in the laptop personal computer 100 with the lens unit 3 at a position corresponding to the window 120. This implements the laptop personal computer 100 having the camera function.

Although the electronic device incorporating the blade open-close device 1 is the laptop personal computer 100 in the above example, the blade open-close device according to one or more embodiments of the present invention may be used in many electronic devices having the camera function, in addition to laptop personal computers, such as smart speakers and home security cameras.

Although the embodiments of the present invention have been described above, the present invention is not limited to the above embodiments and may be modified variously within the scope of its technical idea.

As described above, a thin blade open-close device according to a first aspect of the present invention can be incorporated in a limited space. The blade open-close device is mountable on a module board including a lens unit. The blade open-close device includes a base located on the module board and a cover plate covering at least part of the base. The cover plate has an opening aligned with an optical axis of the lens unit. The blade open-close device includes a blade movable in an opening and closing direction perpendicular to the optical axis in a blade chamber defined between the cover plate and the base, an actuator that moves the blade between a closing position to close the opening and an opening position to uncover the opening, and a terminal plate extending parallel to the optical axis. The terminal plate is electrically connected to the actuator. The terminal plate includes connectors at an end of the terminal plate adjacent to the module board to be electrically connected to contacts on the module board.

The blade open-close device with the above structure allows the actuator to be electrically connected to the wiring in the module board with the terminal plate while minimizing a height of the blade open-close device in the optical axis direction. This structure additionally positions the connectors of the terminal plate and the blade opposite to each other in the optical axis direction in the blade open-close device. The blade thus receives less heat generated in joining the connectors to the contacts on the module board with, for example, solder joints, and also receives less flux used during soldering with the solder joints. This reduces defects such as deformation of the blade under heat from the solder joints or flux attached to the blade to disable opening or closing of the blade.

The base may include a body having an accommodating space accommodating the lens unit and a terminal end connected to the body in the opening and closing direction. The terminal end may have a width in a width direction perpendicular to a direction of the optical axis and to the opening and closing direction that is smaller than a width of the body by a predetermined recess width to provide a recess adjacent to the body in the opening and closing direction. In this structure, the terminal plate may be located in the recess. The blade open-close device with the above structure allows the actuator to be electrically connected to the wiring in the module board with the terminal plate while minimizing a width of the blade open-close device. This structure additionally positions the connectors of the terminal plate and the blade opposite to each other in the opening and closing direction in the blade open-close device. The blade thus receives less heat generated in joining the connectors to the contacts on the module board with, for example, solder joints, and also receives less flux used during soldering with the solder joints. This further reduces defects such as deformation of the blade under heat from the solder joints or flux attached to the blade to disable opening or closing of the blade.

The actuator may include a flat U-shaped yoke including two arms, a coil wound around one of the two arms of the yoke, a rotor magnet rotatably located between the two arms of the yoke, and a lever connected to the rotor magnet. The lever includes an engagement part engaged with a cam groove in the blade.

The blade open-close device may be mounted on a surface of the module board on which the lens unit is mounted. The base may include walls surrounding the lens unit.

The actuator may retain the blade at least at one of the opening position or the closing position without any current flowing through the actuator.

The blade may at least partially block light entering the lens unit through the opening to obstruct image capturing performed by the lens unit. The blade may also have a predetermined optical effect to light entering the lens unit through the opening to obstruct image capturing with the lens unit. The blade may have an outer surface having a visible color or design.

An electronic device according to a second aspect of the present invention includes a module board, a lens unit mounted on the module board, and the blade open-close device described above.

What is claimed is:

1. A blade open-close device mountable on a module board including a lens unit, the device comprising:
   a base located on the module board;
   a cover plate covering at least part of the base and having an opening aligned with an optical axis of the lens unit;
   a blade movable in an opening and closing direction perpendicular to the optical axis in a blade chamber defined between the cover plate and the base;
   an actuator configured to move the blade between a closing position to cover the opening and an opening position to uncover the opening, wherein the actuator comprises a terminal;
   a coil wound around the terminal of the actuator; and
   a terminal plate extending parallel to the optical axis, wherein the terminal plate is fixed and electrically connected to the terminal,
   wherein the terminal plate includes connectors at an end of the terminal plate adjacent to the module board to be fixed and electrically connected to contacts on the module board.

2. The blade open-close device according to claim 1, wherein
   the blade open-close device is mounted on a surface of the module board on which the lens unit is mounted.

3. The blade open-close device according to claim 1, wherein the terminal plate is in direct contact with the actuator, and the terminal plate is in direct contact with the module board.

4. An electronic device, comprising:
   a module board;
   a lens unit mounted on the module board; and
   the blade open-close device according to claim 1.

5. A blade open-close device mountable on a module board including a lens unit, the device comprising:
   a base located on the module board;

a cover plate covering at least part of the base and having an opening aligned with an optical axis of the lens unit;

a blade movable in an opening and closing direction perpendicular to the optical axis in a blade chamber defined between the cover plate and the base;

an actuator configured to move the blade between a closing position to cover the opening and an opening position to uncover the opening; and a terminal plate extending parallel to the optical axis and electrically connected to the actuator, wherein the terminal plate includes connectors at an end of the terminal plate adjacent to the module board to be electrically connected to contacts on the module board, wherein the base includes a body having an accommodating space accommodating the lens unit, and a terminal end connected to the body in the opening and closing direction, the terminal end has a width in a width direction perpendicular to a direction of the optical axis and to the opening and closing direction that is smaller than a width of the body by a predetermined recess width to provide a recess adjacent to the body in the opening and closing direction, and the terminal plate is located in the recess.

6. The blade open-close device according to claim 5, wherein the predetermined recess width is smaller than or equal to half the width of the body.

* * * * *